(12) United States Patent
Vanstaen et al.

(10) Patent No.: US 10,582,666 B2
(45) Date of Patent: Mar. 10, 2020

(54) GRAIN PAN FOR A COMBINE HARVESTER

(71) Applicant: CNH Industrial America LLC, New Holland, PA (US)

(72) Inventors: Patrick Vanstaen, Houthulst (BE); Willem De Coninck, Ninove (BE); Bart Derynck, Aartrijke (BE); Frank R. G. Duquesne, Zwevegem (BE); Michiel J. Vanderstrichele, Merkem (BE); Kris S. Vanhee, Deinze (BE)

(73) Assignee: CNH Industrial America LLC, New Holland, PA (US)

( * ) Notice: Subject to any disclaimer, the term of this patent is extended or adjusted under 35 U.S.C. 154(b) by 29 days.

(21) Appl. No.: 15/956,198

(22) Filed: Apr. 18, 2018

(65) Prior Publication Data

US 2019/0320588 A1 Oct. 24, 2019

(51) Int. Cl.
*A01F 12/46* (2006.01)
*A01F 12/44* (2006.01)

(52) U.S. Cl.
CPC ............... *A01F 12/46* (2013.01); *A01F 12/44* (2013.01)

(58) Field of Classification Search
CPC ......... B07B 1/4645; B07B 1/469; B07B 1/46; B07B 2201/02; B01D 29/07; B01D 2201/40; B01D 29/445; A01F 12/46; A01F 12/44; A01F 12/446; A01F 12/30; A01F 12/34; A01F 12/32
See application file for complete search history.

(56) References Cited

U.S. PATENT DOCUMENTS

| | | | | |
|---|---|---|---|---|
| 607,598 A | * | 7/1898 | Closz | B07B 1/46 209/405 |
| 632,271 A | * | 9/1899 | Martel | A01F 12/18 460/59 |
| 3,478,750 A | * | 11/1969 | Dahlquist | A01F 12/30 460/85 |
| 3,734,103 A | * | 5/1973 | Mathews | A01F 7/06 460/108 |
| 3,757,797 A | * | 9/1973 | Mathews | A01F 7/06 460/91 |
| 3,913,589 A | | 10/1975 | Rouse et al. | |

(Continued)

FOREIGN PATENT DOCUMENTS

| | | | |
|---|---|---|---|
| DE | 2912228 A1 * | 10/1980 | ........... B07B 1/4645 |
| EP | 0850556 A | 7/1998 | |

(Continued)

*Primary Examiner* — Arpad Fabian-Kovacs
(74) *Attorney, Agent, or Firm* — Peter K. Zacharias; Patrick M. Sheldrake

(57) ABSTRACT

A grain pan for a combine harvester comprises a plurality of grain pan members with a closed surface grain contacting surface adapted to engage the harvested crop. More than one of the grain pan members are grain pan members comprising a first connection element and a second connection element, the first connection element being adapted to effectuate a detachable connection with the second connection element of another grain pan body member and vice versa. The grain pan members are detachably connected to each other, one behind the other via their respective first and second connection elements, in a direction substantially parallel to the main direction of grain transportation.

16 Claims, 8 Drawing Sheets

(56) References Cited

U.S. PATENT DOCUMENTS

| | | | | |
|---|---|---|---|---|
| 4,471,788 A | * | 9/1984 | Meier | A01F 12/44 |
| | | | | 460/29 |
| 4,892,767 A | * | 1/1990 | Freissle | B07B 1/4645 |
| | | | | 209/414 |
| 5,466,190 A | * | 11/1995 | Skinner | A01F 12/44 |
| | | | | 460/101 |
| 5,527,219 A | * | 6/1996 | Schumacher | A01F 12/446 |
| | | | | 460/101 |
| 6,006,923 A | * | 12/1999 | Helmy | B07B 1/4645 |
| | | | | 209/397 |
| 6,238,285 B1 | | 5/2001 | Gryspeerdt et al. | |
| 6,398,639 B1 | * | 6/2002 | Dammann | A01F 12/26 |
| | | | | 460/107 |
| 6,443,310 B1 | * | 9/2002 | Schulte, Jr. | B01D 29/012 |
| | | | | 209/399 |
| 8,968,065 B2 | * | 3/2015 | Bilde | A01F 12/30 |
| | | | | 460/90 |
| 9,226,450 B2 | | 1/2016 | Pearson et al. | |
| 2014/0080554 A1 | * | 3/2014 | Bilde | A01F 12/30 |
| | | | | 460/73 |
| 2014/0128133 A1 | * | 5/2014 | Claerhout | A01F 12/446 |
| | | | | 460/101 |
| 2018/0132421 A1 | * | 5/2018 | Ohms | A01F 12/26 |

FOREIGN PATENT DOCUMENTS

| | | | | |
|---|---|---|---|---|
| GB | 1270225 A | | 4/1972 | |
| GB | 1536986 A | | 12/1978 | |
| JP | 06141661 A | * | 5/1994 | A01F 12/32 |
| JP | 2012039958 A | | 3/2012 | |

* cited by examiner

GRAIN PAN FOR A COMBINE HARVESTER

FIELD OF THE INVENTION

The invention relates to the field of combine harvesters and the grain pan thereof.

BACKGROUND OF THE INVENTION

Combine harvesters are used to harvest crop on a field, such as wheat, oats, rye, barley, corn, sorghum, soybeans, sunflowers, canola, etc. After the threshing and separation process, a grain pan conveys the harvested crop to the next phase, for example the cleaning unit. This is usually achieved by shaking the grain pan. The grain pan may be part of a cleaning shoe.

Conventionally the grain pan is a welded steel construction with a thin steel plate. The grain pan is welded, usually spot welded, to the side beams. Under the steel plate cross profiles provide additional support. This conventional design suffers from vulnerabilities with regards to fatigue. Due to the high cycle loads the grain pan is exposed to, failure is a frequently occurring issue. In case of failure, the entire grain pan needs to be replaced, often together with the side beams.

Between the grain pan and the side beams, gaps are present in the conventional design. Deformation of the various parts due to the high cycle loads causes said gaps to grow. These gaps form so called grain leaks, since crop falls through these gaps. This results not only in loss of product, but as well in crop being stuck in undesired places, e.g. between the thin steel plate and the side beams and/or the cross profiles.

The object of the present invention is to provide an improved grain pan.

SUMMARY OF THE INVENTION

The object of the invention is achieved by such grain pan for a combine harvester, also referred to as combine. The combine harvester is adapted to harvest crop on the field, such as wheat, oats, rye, barley, corn, sorghum, soybeans, sunflowers, canola, etc. After the threshing and separation process, the grain pan conveys the crop to the next phase, for example the cleaning unit. In the context of the present invention, crop is to be understood as the harvested product as a whole. This may comprise the desired product, e.g. grain, but also other parts that may enter the combine harvester during the harvesting process, such as sand, dirt, stems, leaves, etc.

The grain pan is adapted to convey the crop in at least a main direction of grain transportation. This is achieved by moving the grain pan back and forth in the main direction of grain transportation, resulting as it were in a shaking movement of the grain pan. The shaking movement can be accomplished by driving means that drive the grain pan directly or indirectly. Besides transportation, the shaking movement may also result in a desired distribution of the crop. Such a desired distribution can for example include the heavier parts at the bottom and the lighter parts on top. In some embodiments the grain pan may be adapted to convey the crop in more than one direction of grain transportation, e.g. to compensate for a sloping ground.

Traditionally, the crop will eventually fall of the grain pan after being conveyed in the main direction of grain transportation. In some embodiments a rake is connected to the end of the grain pan. The falling crop can be received by one or more sieves, which are adapted to separate the grain from the other parts in the crop. In some cases, the fallen crop is received by another grain pan, which may or may not be connected to the same driving means as the first grain pan. This is generally referred to as a multi-step grain pan. It is to be understood that, in the context of the present invention, in such a multi-step grain pan, each step is to be viewed as an independent grain pan. Each independent grain pan may or may not be in accordance to the invention.

In accordance to the invention, the grain pan comprises a plurality of grain pan members, that are connected to each other. Thus, the grain pan is a modular system. Preferably, the connected grain pan members behave as a single entity. Such a modular system allows to make a custom sized grain pan by adding or removing grain pan members. It further allows to replace one grain pan member instead of the complete grain pan when needed, e.g. in case of failure due to fatigue.

The grain pan members comprise a grain contacting surface. The grain contacting surface is adapted to engage the harvested crop. When the grain pan is in rest, i.e. not subjected to the shaking movement, the grain contacting surface may carry at least a part of the crop that is present on the grain pan. When the grain pan is subjected to the shaking movement, grain may move from a first location to a second location. The first and/or second location may be on the same grain contacting surface or, since the grain pan comprises more than one grain pan member, one of them may be on the grain contacting surface of another grain pan member. The first location may also be on an element adapted to pass the harvested crop to the grain pan. The second location may also be on a rake, a sieve, another grain pan or any other element adapted to receive the crop when it leaves the grain pan.

The grain contacting surface is a closed surface. In this context a closed surface is to be understood as a continuous, non-porous surface. In other words, no holes are present in the grain contacting surface, in contrary to the top surface of a sieve. The main purpose of the grain contacting surface is to engage the harvested crop that is to be transported in the main direction of grain transportation.

The grain contacting surface substantially extends in a first direction. The first direction in which the grain contacting surface substantially extends is parallel to the main direction of grain transportation. In case the grain contacting surface is a non-flat profile, e.g. a saw-tooth profile, said direction in which the grain contacting surface substantially extends is to be understood as the direction in which the consecutive profiles, e.g. saw-teeth, are arranged. The grain contacting surfaces of the grain pan members is part of an operational surface of the grain pan.

The grain pan members comprise a first and a second connection element. The first connection element is adapted to effectuate a detachable connection with the second connection element of another grain pan member and vice versa. As such, the various grain pan members can be connected to each other. Since the grain pan members comprises the same first and the same second connection elements, any grain pan member can be detachably connected to any other grain pan member. The grain pan members are detachably connected to each other, one behind the other, in a direction substantially parallel to the main direction of grain transportation. Thus, the grain pan members are modular elements and the grain pan is a modular system. As a practical example, a grain pan member may be 200 mm long, and a grain pan might comprise eight grain pan members connected to each other in series in the main direction of grain transportation.

In an embodiment, the grain pan members are identical. Therewith, they are interchangeable. Alternatively, they might have differences relative to each other and have a predetermined order in which they should be connected. Said differences could be in dimension, material, means for connecting to surrounding structures, profile of the grain contacting surface, etc.

In an embodiment various grain pan members can be connected to each other by mating male and female parts. For example, a first grain pan member can be attached to a second grain pan member. The first connection element is a part of the grain pan member that is adapted to be a male part. The second connection element is a part of the grain pan member that is adapted to be a female part. The male part and the female part are adapted to be mating shapes. The grain pan members in the grain pan according to the invention comprise both the first and the second connection element. However, as will be explained below, the grain pan may further comprise grain pan members that comprises only one of both connection elements.

In a further embodiment the first grain pan member can be attached to the second grain pan member by clicking them in each other with a snap connection. For example, the male and female part can be shaped to allow for introducing the male part of the first grain pan member into the female part of the second grain pan member, while keeping the first grain pan member under an angle, e.g. between 0 and 90 degrees, relative to the second grain pan member.

Once the male part of the first grain pan member is introduced in the female part of the second grain pan member, one of both grain pan members can be subjected to a rotating movement relative to the other, such that at the end of the rotating movement the first and the second grain pan member are aligned.

During the rotating movement, the male part of the first grain pan member snaps into the female part of the second grain pan member. Due to the pretension and/or friction between the male part and the female part, the first and second grain pan member are now rigidly connected to each other. It is envisaged however, that other common connection means known the skilled person can be used as well to attach various grain pan members.

In an embodiment, the grain pan may comprise a grain pan member that is a front grain pan member. "Front" in this context is to interpreted as the most upstream when seen in the main direction of grain transportation.

Said front grain pan member may comprise only one of the first and the second connection element. As such, the front grain pan member can only be attached to one other grain pan member. This way, the front grain pan member is adapted to be the most upstream grain pan member when viewed in the main direction of grain transportation.

In an embodiment, the grain pan may comprise a grain pan member that is a rear grain pan member. "Rear" in this context is to interpreted as the most downstream when seen in the main direction of grain transportation.

Said rear grain pan member may comprise only one of the first and the second connection element. As such, the rear grain pan member is adapted to be the most downstream grain pan member when viewed in the main direction of grain transportation. When both present, the front and rear grain pan member each comprise the other one of the first and second connection element.

In an embodiment, the grain pan may comprise both the front and the rear grain pan member.

In an embodiment, at least one grain pan member has a cross sectional shape which is adapted to reinforce the grain pan member, such that the grain contacting surface is prevented from bending when subjected to gravity and/or operational loads. Thus, the grain pan member is designed such that its shape reinforces the grain pan member. Due to this reinforcement, the grain pan member does not bend during operation, without the need of additional support. As such, the grain pan member is a self-supporting structure, meaning that is stable while resisting gravity and/or operational loads. This is in contrary to the conventional grain pan design, where the grain contacting surface is a thin steel plate, supported by support bars or cross profiles to prevent it from bending. In the current embodiment, said support bars or cross profiles are no longer required.

In this embodiment, the self-supporting grain pan member is a monolithic body. Therewith the grain pan member is a single entity. It does not comprise a plurality of parts that are connected to each other by any sort of connecting means at any connection locations. Such connection locations, i.e. welds, i.e. spot welds, which are present in the conventional grain pan design, are susceptible to fatigue. Thus, vulnerabilities that inherently exist at such connections location are eliminated by the monolithic grain pan member in this embodiment. Therefore fatigue and failure can be reduced, and life expectancy can be extended. Furthermore, dimensional stability is improved by the monolithic design. Therewith deformations due to high cycle loads are eliminated or at least reduced. This reduces the gaps caused by said deformation and the corresponding grain leaks.

In a further embodiment, at least one grain pan member is an extruded element. This allows to create complex monolithic profiles with a high quality surface finish. However, other manufacturing methods, which may or may not result in a monolithic body, could be used, such as molding, hydroforming or 3D-printing.

In an embodiment, the grain pan member is an aluminum element. This advantageously reduces the weight compared to a similar steel construction. The shaking movement to which the grain pan is subjected, causes a high cycle load. Therefore weight reduction is greatly beneficial with regards to fatigue, dimensioning of the structure and the driving means of the combine harvester, energy consumption, etc. Furthermore it allows for surface treatments, e.g. anodizing, to improve characteristics such as corrosion resistance and wear resistance. However, alternative materials such as plastic-like materials, fiber-reinforced materials or synthetic materials could be used. In an embodiment, the grain pan member is an extruded aluminum module.

The combine harvester in which the grain pan is to be used optionally comprises a fan, which can be used to blow air onto the crop falling down from the grain pan or rake. The falling crop can be received by a sieve or, e.g. in a multi-step grain pan, by another grain pan. The fan can blow the air onto the crop to separate the lighter, usually non-desired, parts from the harvested crop. Usually the fan is located somewhere below the grain pan, and the air will flow via the bottom of the grain pan onto the falling crop.

In the conventional design the grain pan is provided with a support structure under the thin steel plate. The support structure is intended to carry the weight of the grain pan. This is usually achieved by relatively thick and heavy steel profiles. The minimize the weight of the grain pan and to optimize the weight distribution, the steel profiles are only included where necessary. This results in an unequal surface. Such a surface is disadvantageous for guiding the air blown by the fan. It entails disturbances that can cause suboptimal, even turbulent flow.

The monolithic body, if present, and the absence of an additional support structure and of the grain pan member allow to design the grain pan in a way that is beneficial for guiding the air towards the crop. This may allow for a lighter and/or smaller design of the fan.

For this purpose, the grain pan member may in an embodiment further comprise a bottom surface, wherein the bottom surface is located substantially opposite of the grain contacting surface. The bottom surface and the grain contacting surface may have different profiles. In such a case, substantially opposite is to be understood as to be located on a predetermined distance of each other and to be substantially extending substantially in the same directions, e.g. in the main direction of grain transportation and a direction perpendicular to the main direction of grain transportation. In case the bottom surface and the grain contacting surface extend in a non-parallel direction, the angle between those directions will usually be relatively small. Such a small non-parallelism is to be interpreted as extending substantially in the same directions.

The bottom surface is adapted to guide the air in a beneficial manner. In an embodiment, the bottom surface may be a substantially closed surface. In this context a substantially closed surface is to be understood as a continuous, non-porous surface. One or more cavities, e.g. intended for connection means may be present however, such as screw ports, threaded holes, T-shaped channels, etc. The substantially closed surface is advantageous to guide the air blown by the fan with limited disturbances. This may allow for a lighter and/or smaller design of the fan.

In an embodiment, the bottom surface may be a substantially flat surface. In this context a substantially flat surface is to be understood a profile that is intended to be flat. Irregularities inherent to a specific material are not to be considered. Again, cavities intended for connection means may be present.

In an embodiment, the air guide may comprise an air guide profile. The air guide profile can be adapted to guide the air in an even more beneficial manner. Furthermore, the air guide profile may guide the air in a way that results in a better cross and longitudinal air distribution on the sieves.

In an embodiment, the grain contacting surface of the grain pan member is, when looked at from side view, shaped as a saw-tooth profile. This allows for a better distribution of the heavy parts and lighter parts. During the shaking movement of the grain pan, the heavy parts will fall into the grooves of the saw-tooth profile. As a practical example, the height of each tooth may be 10 mm (0.39 inch) and the width may be 40 mm (1.57 inch). However, the grain contacting surface may be formed in an other shape or a combination of shapes, e.g. flat, bended, waving, etc.

The grain pan can be adapted to be connected to a frame. The frame is adapted to hold the grain pan. In the conventional design the grain pan is connected to the frame by welding, usually spot welding. This entails the gaps in between the grain pan and the frame in between of the spot welds. Deformation of the various parts of the non-monolithic design due to the high cycle loads can cause said gaps to grow. These gaps form so called grain leaks, since crop falls through these gaps. This results not only in loss of product, but as well in crop being stuck in undesired places, e.g. between the thin steel plate and the frame and/or the cross profiles.

In an embodiment of the present invention, at least one of the grain pan members is adapted to be connected, preferably detachably connected, to a frame. The frame is adapted to hold the grain pan and the frame and the grain pan are adapted such that, when connected, at least one side of the frame is next to at least one side of the grain pan for at least one overlapping area. The frame might be longer or shorter than the grain pan, and might be next to the grain pan on one or more sides of the grain pan. An overlapping area is meant to be a part where the frame and the grain pan are side by side. Said sides are adjacent. As a practical example, the frame might have a rectangular shape and surround the grain pan. In such case, there are four overlapping areas, corresponding with the four sides of the grain pan. The connection enables, when connected, said sides of the grain pain and the frame to be in contact along at least one overlapping area. Thus, said sides are adjoining. Adjoining in this context means that the sides of the grain pan and the frame are in contact with each other. As such, the gap between the grain pan and the frame is minimized or even eliminated. This eliminates, or at least reduces, the grain leak.

In an embodiment of the present invention, at least one grain pan member is adapted to be detachably connected to the frame by a mechanical connection means. As such it is possible to replace only one of the grain pan or frame when needed, e.g. in case of failure due to fatigue. The frame may comprise a vertical part. The vertical part is located next to the grain pan. When looked at from side view, this might be before, behind, on the left side or on the right side of the grain pan.

The grain pan member may be provided with at least one of a screw port, a threaded hole, a T-shaped channel, or any other means to ensure a detachable connection known by the skilled person. The frame provided with a cavity. The cavity is intended for the mechanical connecting means for the detachable connection. The grain pan member and therewith the grain pan can be attached to the frame by introducing the mechanical connection means through the cavity into the grain pan member. However, other methods for connecting known by the skilled person may be used. For example, a mechanical connection means such as a screw or bolt may be attached to the grain pan member. The frame may still be provided with a cavity. The mechanical connection means may then be introduced through the cavity and secured, e.g. by a nut.

The frame may comprise a horizontal part. The horizontal part extends a limited distance under the grain pan. Limited in this context is to interpreted as sufficient to provide a connection means, yet not providing any additional support to the grain pan member. The horizontal part does not extend under the complete width or length of the grain pan. The frame may comprise one or both of the horizontal and the vertical part, or the frame may be shaped differently. In case the frame comprises both the horizontal and the vertical part, the horizontal part may extend inwards from the vertical part. It is to be clear that this horizontal part in this embodiment is adapted for attaching the grain pan to the frame. It is not adapted to provide additional support for the grain pan. It is therefore not to be interpreted as part of the grain pan, but as part of the frame.

In an embodiment the grain pan member is provided with a T-shaped channel and the frame is provided with a cavity in the horizontal part. An element with a threaded hole, e.g. a slot stone or a threaded nut, can be introduced in the T-shaped channel. The slot stone can be adapted to receive a bolt. The bolt can be introduced in the slot stone through the cavity in the frame, such that the grain pan member can be connected to the frame. However, other common ways to achieve a mechanical, detachable connection, such as those described with respect to connecting the grain pan to the vertical part, may be used. Vice versa, a T-shaped channel may also be used to connect the grain pan to the vertical part of the frame.

In an embodiment, the grain pan comprises a front profile. A connecting means adapted to connect a front sealing to the grain pan is provided. The front sealing is used to prevent crop from falling before the grain pan. The connecting means may be any common solution known to the skilled person, e.g. snap connection, treaded connection, etc. In an embodiment, the front grain pan member comprises the front profile.

In an embodiment, the grain pan comprises a rear profile. A connecting means adapted to connect to a rake to the grain pan is provided. The rake is used to separate the grain and material other than grain (MOG), with the intention to ensure that the grain is at the bottom on the sieve in order to fall through it. The connecting means may be any common solution known to the skilled person, e.g. snap connection, treaded connection, etc. In an embodiment, the rear grain pan member comprises the rear profile.

When looked at from side view, there may be a cavity between grain contacting surface and the bottom surface. In an embodiment, this cavity can be at least partially filled with a material, for example a foam-like material. This way the stiffness of the grain pan member can be increased, which allows for the use of a thinner grain contacting surface and/or bottom surface. This can result in even more weight reduction.

Various possible embodiments of a grain pan in accordance to the invention have been described herein, relating to various features. It is to be understood, that all embodiments can be combined with each other unless mentioned otherwise.

The invention further relates to a combine harvester comprising a grain pan in accordance to the invention. Said grain pan can be in any of the above described embodiments.

BRIEF DESCRIPTION OF THE DRAWINGS

The invention will be described in more detail below in reference to the figures, in which in a non-limiting manner exemplary embodiments of the invention will be shown. Across the various figures, the same reference numbers have been used to indicate the same features. The various figures show the same embodiment, or at least a part thereof. It should be noted that the invention is not limited to the shown embodiment. Furthermore, a grain pan does not need to comprise all shown features to be in accordance with the invention.

In the figures.

DETAILED DESCRIPTION OF THE DRAWINGS

Figure 1:
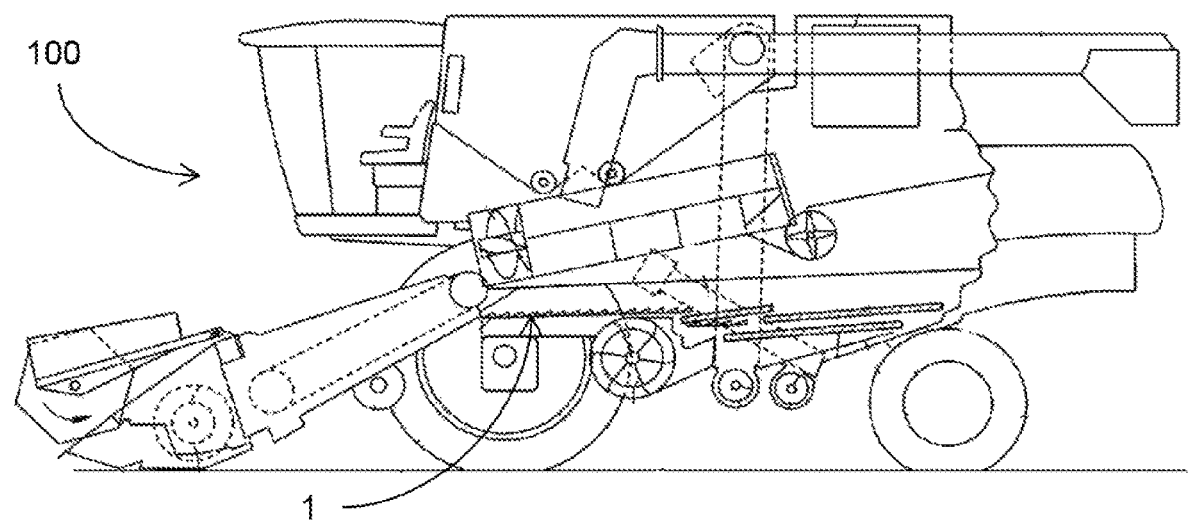
FIG. 1: shows a combine harvester with a grain pan therein.

FIG. 1 shows a combine harvester 100 with a grain pan 1 therein. The combine harvester 100 is adapted to harvest crop on the field, such as wheat, oats, rye, barley, corn, sorghum, soybeans, sunflowers, canola, etc. After the threshing and separation process, the grain pan 1 conveys the crop to the next phase, for example the cleaning unit.

Figure 2:
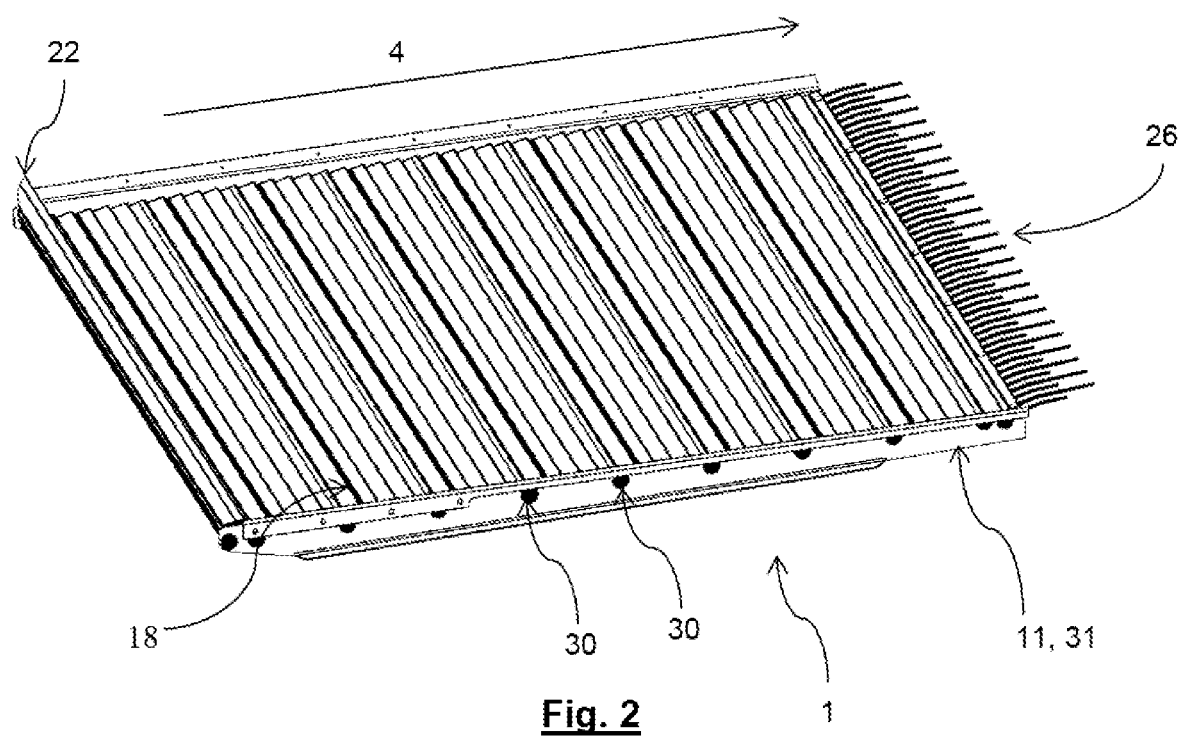
FIG. 2: shows an isometric view of a possible embodiment of a grain pan in accordance to the invention.
Figure 3:
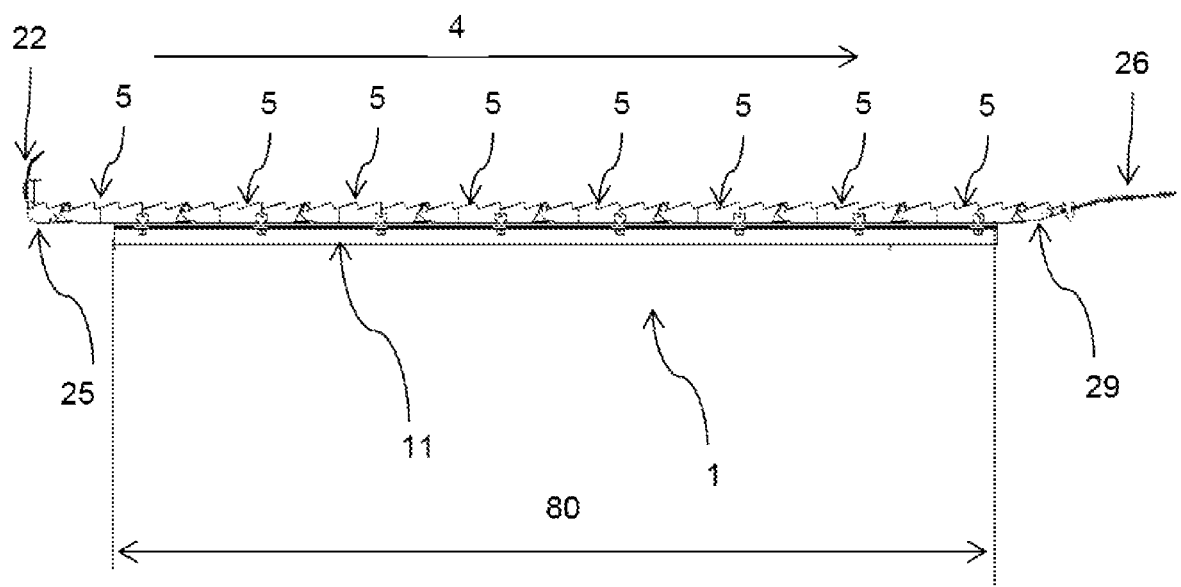
FIG. 3: shows a side view of a possible embodiment of a grain pan in accordance to the invention.

FIG. 2 and FIG. 3 show an isometric view and a side view respectively a possible embodiment of a grain pan 1 in accordance to the invention. The grain pan 1 shown in FIG. 2 and FIG. 3 comprises multiple grain pan members, in particular a front grain pan member 25, a rear grain pan member 29 and eight grain pan members 5.

The grain pan 1 suitable for a combine harvester 100. The grain pan 1 is adapted to convey the crop in at least a main direction of grain transportation 4. This is achieved by moving the grain pan 1 back and forth in the main direction of grain transportation 4, resulting as it were in a shaking movement of the grain pan 4. The shaking movement can be accomplished by driving means (not shown) that drive the grain pan 1 directly or indirectly.

Figure 4:
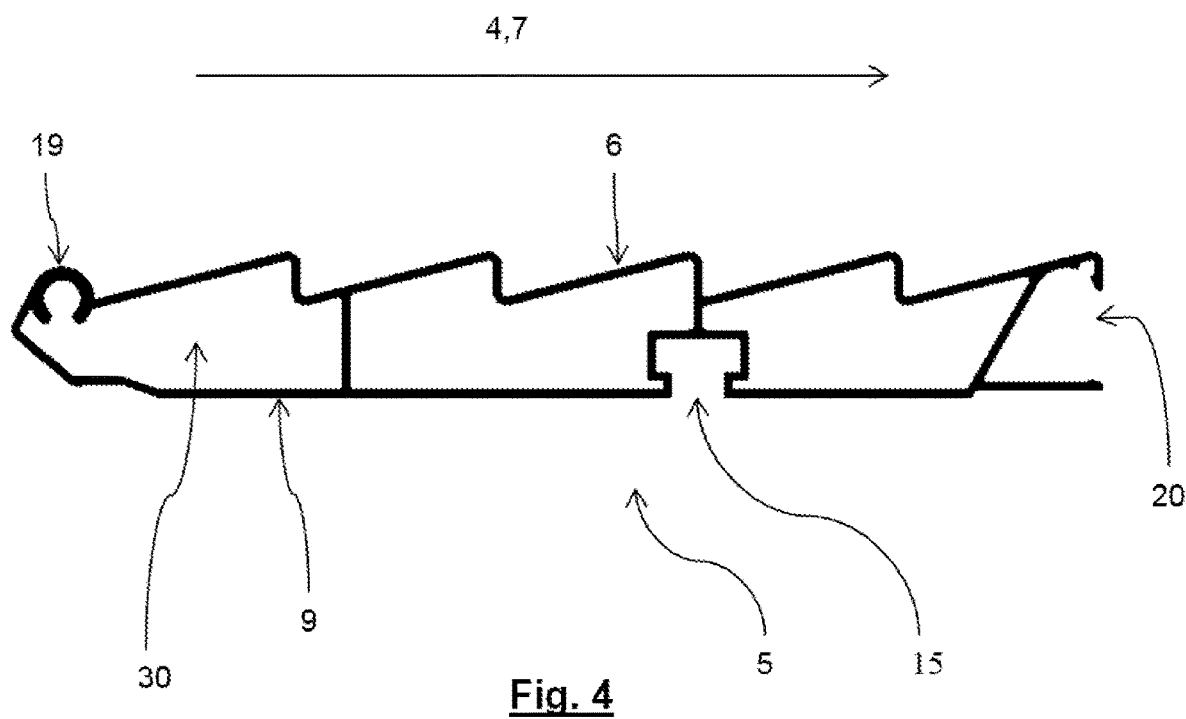
FIG. 4: shows a side view of a possible embodiment of a grain pan member in accordance to the invention.

FIG. 4 shows a side view of a possible embodiment of a grain pan member 5. The grain pan 1 comprises a plurality of grain pan members 5, that are connected to each other. The grain pan members 5 comprise a grain contacting surface 6. The grain contacting surface 6 is adapted to engage the crop. When the grain pan 1 is in rest, i.e. not subjected to the shaking movement, the grain contacting surface 6 may carry the crop that is present on the grain pan member 5. When the grain pan 1 is subjected to the shaking movement, the crop may move from a first location to a second location. The first and/or second location may be on the same grain contacting surface 6 or, since the grain pan 1 comprises more than one grain pan member 5, one of them may be on the grain contacting surface 6 of another grain pan member 5. The first location may also be on an element (not shown) adapted to pass the harvested crop to the grain pan 1. The second location may also be on a rake 26, a sieve (not shown), another grain pan 1 or any other element adapted to receive the crop when it leaves the grain pan 1.

The grain contacting surface 6 is a closed surface. In this context a closed surface is to be understood as a continuous, non-porous surface. In other words, no holes are present in the grain contacting surface 6, in contrary to the top surface of a sieve. The main purpose of the grain contacting surface 6 is to engage the harvested crop.

The grain contacting surface 6 substantially extends in a first direction 7. The first direction 7 in which the grain contacting surface 6 substantially extends is parallel to the main direction of grain transportation 4. The first direction 4 and the main direction of grain transportation 4 are indicated by the same arrow in FIG. 4. The grain contacting surface 6 in the shown embodiment is a saw-tooth profile. In case of such a non-flat profile, the first directions in which the grain contacting surface 6 substantially extends is to be understood as the direction in which the consecutive profiles, i.e. the saw-teeth, are arranged.

The grain pan member 5 comprises a first connection element, which is a male part 19, and a second connection element, which is a female part 20. The first connection element is adapted to effectuate a detachable connection with the second connection element of another grain pan member 5 and vice versa, as will be explained in more detail further below with reference to FIG. 5.

The grain pan member 5 has a cross sectional shape which is shown in FIG. 4. The cross sectional shape is adapted to reinforce the grain pan member 5, such that the grain contacting surface 6 is prevented from bending when subjected to gravity and/or operational loads. Thus, the grain pan member 5 is designed such that its shape reinforces the grain pan member 5. Due to this reinforcement, the grain pan member 5 does not bend during operation, without the need of additional support. As such, the grain pan member 5 is a self-supporting structure, meaning that is stable while resisting gravity and/or operational loads. Therefore, as can be seen in the figures, no support bars or cross profiles are required. Thus, no additional support, e.g. by cross profiles or support bars under the grain pan 1 or grain pan member 5, are present.

The self-supporting grain pan member 5 further is a monolithic body. Therewith the grain pan member 5 is a single entity. It does not comprise a plurality of parts that are connected to each other by any sort of connecting means at any connection locations. Such connection locations, i.e. welds, i.e. spot welds, which are present in the conventional grain pan design, are susceptible to fatigue.

The grain pan member 5 is an extruded element. This allows to create complex monolithic profiles with a high quality surface finish. However, other manufacturing methods to make a monolithic body could be used, such as molding, hydroforming or 3D-printing.

The grain pan member 5 is an aluminum element. This advantageously reduces the weight compared to a similar steel construction. The shaking movement to which the grain pan 1 is subjected, causes a high cycle load. Therefore weight reduction is greatly beneficial with regards to fatigue, dimensioning of structure and driving means of the combine harvester, energy consumption, etc. Furthermore, it allows for surface treatments like anodizing to improve characteristics such as corrosion and wear resistance. However, other materials such as plastic-like materials, fibre-reinforced materials or synthetic materials could be used. In an embodiment, the grain pan member is an extruded aluminum module.

The grain contacting surface 6 of the grain pan member 5 is, when looked at from side view, shaped as a saw-tooth profile. This allows for a better distribution of the heavy parts and lighter parts. During the shaking movement of the grain pan 1, the heavy parts will fall into the grooves of the saw-tooth profile. As an example, the height of each tooth may be 10 mm (0.39 inch) and the width may be 40 mm (1.57 inch). However, the grain contacting surface may be formed in an other shape or a combination of shapes, e.g. flat, bended, waving etc.

The combine harvester 100 optionally comprises a fan (not shown), which can be used to blow air onto the crop falling down from the grain pan 1 or rake. Usually the fan is located somewhere below the grain pan 1, and the air will flow via the bottom of the grain pan onto the falling crop. The monolithic body of the grain pan member 5 allows to design the grain pan 1 in a way that is beneficial for guiding the air towards the crop. This may allow for a lighter and/or smaller design of the fan. For this purpose, the grain pan member 5 further comprises a bottom surface 9. The bottom surface 9 is located substantially opposite of the grain contacting surface 6. The bottom surface 9 and the grain contacting surface 6 have different profiles. In such a case, substantially opposite is to be understood as to be located on a predetermined distance of each other and to be substantially extending substantially in the same directions, in this case in the main direction of grain transportation 4 and a direction perpendicular to the main direction of grain transportation.

The bottom surface 9 is adapted to guide air in a beneficial manner. The bottom surface 9 is a substantially closed surface. In this context a substantially closed surface is to be understood as a continuous, non-porous surface. One or more cavities intended for connection means may be present however, such as a T-shaped channel 15. Other connection means are possible, e.g. screw ports or threaded holes.

The bottom surface 9 further is a substantially flat surface. In this context a substantially flat surface is to be understood a profile that is intended to be flat. Irregularities inherent to a specific material are not to be considered. Furthermore, cavities intended for connection means may still be present. In a possible embodiment, the bottom surface 9 can comprise an air guide profile (not shown). The air guide profile can be adapted to guide the air in a beneficial manner.

The grain pan 1 is a modular system. The grain pan 1 comprises a plurality of grain pan members 5, as can be seen in FIG. 3. Such a modular system allows to make a custom sized grain pan 1 by adding or removing grain pan members 5. Another advantage is the possibility to replace one grain pan member 5 instead of the complete grain pan 1 when needed, e.g. in case of failure due to fatigue. In the shown example, each grain pan member 5 is 200 mm long, and the grain pan 1 comprises eight grain pan members 5 connected to each other in the main direction of grain transportation 4.

Figure 5:
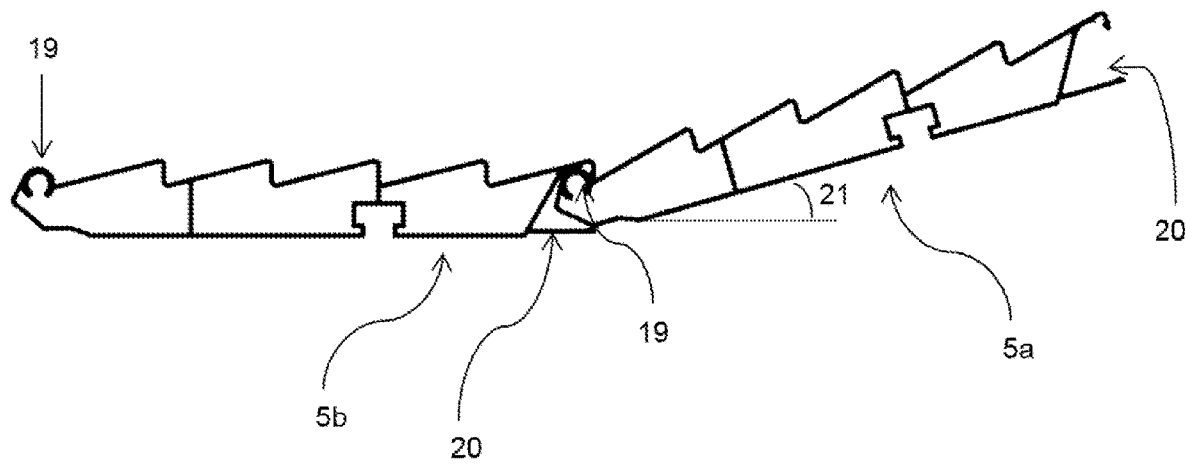
FIG. 5: illustrates a possible way of connecting two grain pan members in accordance to the invention.

FIG. 5 illustrates a possible way of connecting two grain pan members 5. A first grain pan member 5a comprises a male part 19. A second grain pan member 5b comprises a female part 20. In the shown embodiment both grain pan members 5a,5b are identical grain pan members, both comprising a male part 19 and a female part 20. This is the case for the grain pan members 5. However, as will be explained further below, the grain pan 1 also comprises a front grain pan member 25 and a rear grain pan member 29 which comprise only one of both connection elements. They can be connected in the same manner as described hereunder with respect to the grain pan members 5.

The first grain pan member 5a can be attached to the second grain pan member 5b by introducing the male part 19 of the first grain pan member 5a into the female part 20 of the second grain pan member 5b, while keeping the first grain pan member 5a under an angle 21, e.g. in a range between 0 and 90 degrees, relative to the second grain pan member 5b. The male part 19 and the female part 20 have a matching shape that allows the male part 19 to be introduced into the female part 20 under said range of angles.

Once the male part 19 of the first grain pan member 5a is introduced into the female part 20 of the second grain pan member 5b, one of both grain pan members 5a,5b can be subjected to a rotating movement relative to the other, such that at the end of the rotating movement the first grain pan member 5a and second grain pan member 5b are aligned.

During the rotating movement, the male part 19 of the first grain pan member 5a snaps into the female part 20 of the second grain pan member 5b. Due to the pretension and/or friction between the male part 19 and the female part 20, the first grain pan member 5a and second grain pan member 5b are now rigidly connected to each other. It is envisaged however, that other common connection means known the skilled person can be used as well to attach various grain pan members.

Figure 6:
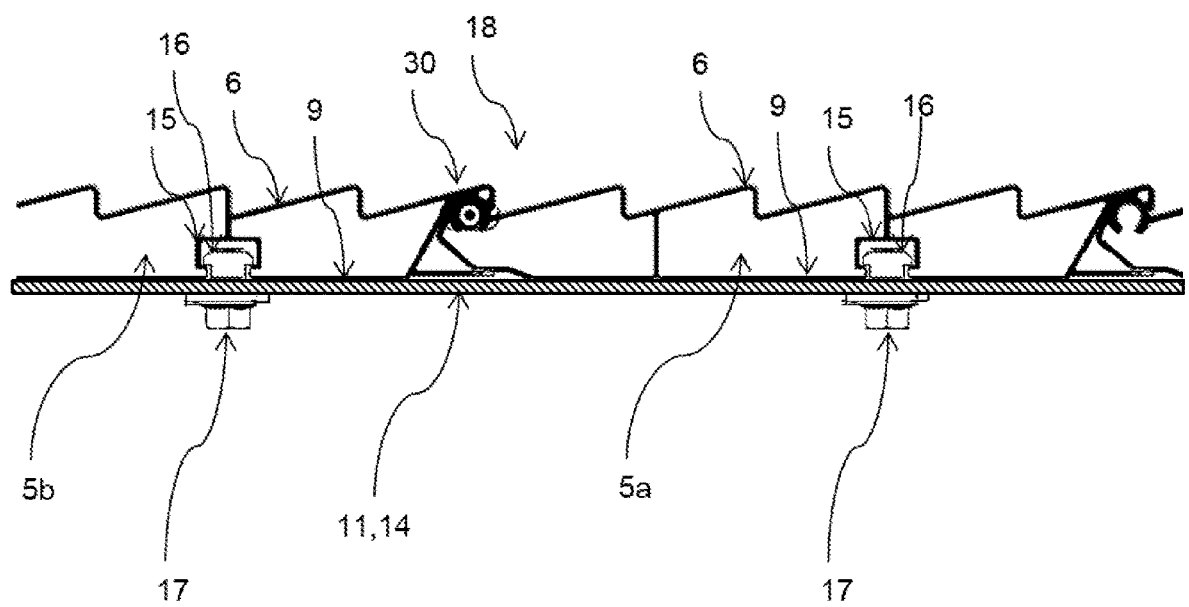
FIG. 6: illustrates a possible way of connecting the grain pan to a frame in accordance to the invention.

FIG. 6 shows the first grain pan member 5a and the second grain pan member 5b in the aligned position. The grain pan 1 comprising multiple grain pan members 5a,5b further comprises an operational surface 18. The grain contacting surface 6 of the grain pan members 5a,5b is part of the operational surface 18 of the grain pan 1. Preferably, the connected grain pan members 5a,5b behave as single entity.

FIGS. 2, 3 and 6 show a frame 11. The frame 11 is adapted to hold the grain pan 1. The frame 11 and the grain pan 1 are connected to each other is such a way that the sides of the grain pan 1 and the frame 11 are adjoining when connected. Adjoining in this context means that the sides of the grain pan and the frame are in contact with each other, thereby minimizing or eliminating potential gaps between the frame 11 and the grain pan 1.

The frame comprises vertical part 31, as shown in FIG. 2. When looked at from side view, the vertical part 31 extends next to the grain pan 1. The grain pan 1 is adapted to be detachably connected to the frame 11 by a mechanical connection means 30, as is shown in FIG. 6. The mechanical connection means 30 comprises a threaded hole provided in the grain pan 1 and a screw fitted therein. However, any other connection means, e.g. a bolt, a T-shaped channel, etc. known by the skilled person could be used.

By connecting the grain pan 1 to the frame 11 in this manner, the grain pain 1 and the frame 11 are adjoining and preferably are parallel to each other. This may reduce or even eliminate the gaps between the grain pan 1 and the frame 11. As such, the grain leak can be eliminated or at least reduced.

The frame 11 further comprises a horizontal part 14. The horizontal part 14 of the frame 11 and the grain pan 1 are adjacent for an overlapping area 80, as is best visible in FIG. 3. The overlapping area is 80 is the area where a side of the frame 11 is next to a side of the grain pan 1. The horizontal part 14 extends a limited distance under the grain pan 1. Limited in this context is to interpreted as sufficient to provide a connection means, yet not providing any additional support to the self-supporting grain pan member 5. The horizontal part 14 does not extend under the complete width or length of the grain pan 1. The horizontal part 14 extends inwards from the vertical part 31. In FIG. 6, the horizontal part 14 extends under the grain pan 1 into the paper. It is to be clear that this horizontal part 14 is adapted for attaching the grain pan 1 to the frame 11, and is not adapted to provide additional support for the grain pan 1. It is therefore not to be interpreted as part of the grain pan 1. In practice, the frame 11 may comprise only one of the vertical part 31 and the horizontal part 14, or the frame may be shaped differently.

The grain pan members 5 are provided with a T-shaped channel 15 on the bottom and the frame 11 is provided with a hole, as is shown in FIG. 6. A slot stone 16 can be introduced in the T-shaped channel 15. The slot stone 15 is adapted to receive a bolt 17. The bolt 17 can be introduced in the slot stone 15 through the hole in the frame 11, such that the grain pan 1 can be connected to the frame 11.

Figure 7:
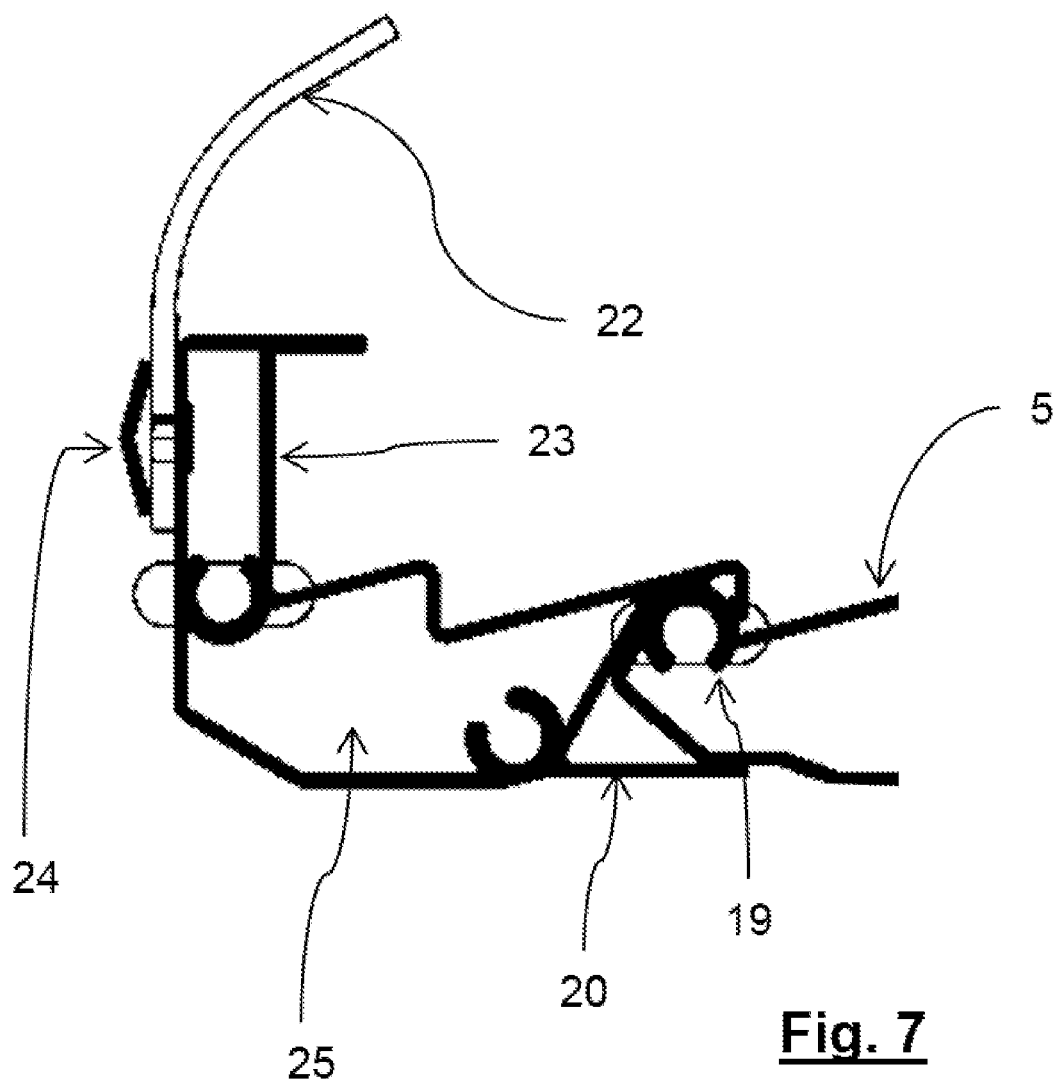
FIG. 7: shows a of a possible embodiment front grain pan member in accordance to the invention.

Referring now to FIG. 7, the grain pan 1 comprises a front profile 23. The front profile 23 comprises a connecting means 24 adapted to connect to a front sealing 22 to the grain pan 1. The front sealing 22 is used to prevent crop from falling before the grain pan 1. The connecting means 24 may be any common solution known to the skilled person, e.g. snap connection, treaded connection, etc.

The grain pan 1 comprises a front grain pan member 25. The front grain pan member 25 comprises the front profile 23. The front grain pan member 25 comprises a female part 20, but no male part 19. As such, the front grain pan member 25 can only be connected to one other grain pan member 5, and can only be located as the most upstream grain pan member when seen in the main direction of grain transportation 4.

Figure 8:
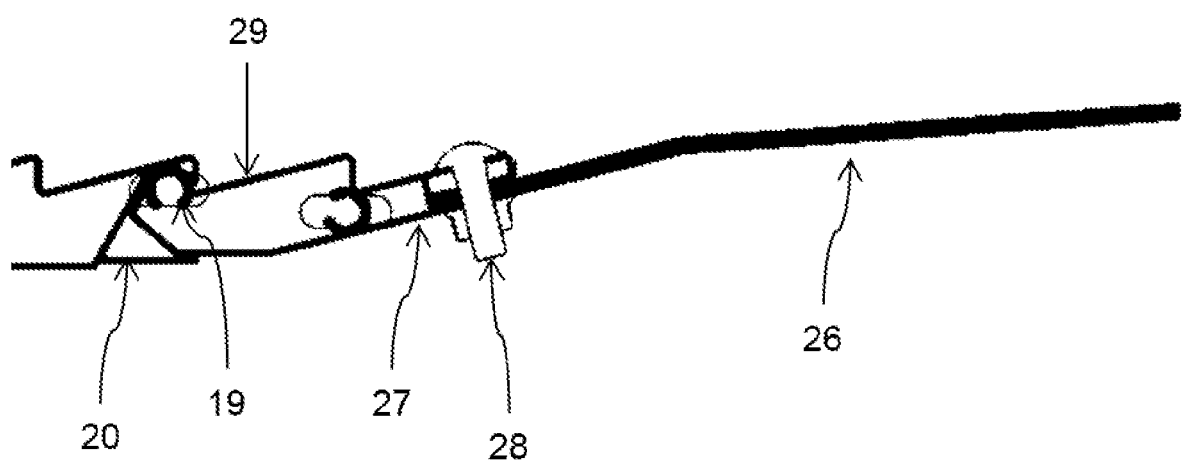
FIG. 8: shows a of a possible embodiment rear grain pan member in accordance to the invention.

Referring now to FIG. 8, the grain pan 1 comprises a rear profile 27. The rear profile 27 comprises a connecting means 28 adapted to connect a rake 26 to grain pan 1. The rake is used to separate the grain and material other than grain (MOG), with the intention to ensure that the grain is at the bottom on the sieve in order to fall through it. The connecting means 28 may be any common solution known to the skilled person, e.g. snap connection, treaded connection, etc.

The grain pan 1 comprises a rear grain pan member 29. The rear grain pan member 29 comprises the rear profile 27. The rear grain pan member 29 comprises a male part 19, but no female part 20. As such, the rear grain pan member 25 can only be connected to one other grain pan member 5 and can only be located as the most downstream grain pan member when seen in the main direction of grain transportation 4.

Referring back to FIG. 4, the side view shows a cavity 30 between grain contacting surface 6 and the bottom surface 9. In an embodiment, this cavity 30 can be at least partially filled with a material, for example a foam-like material. This way the stiffness of the grain pan member 5 can be increased, which allows for the use of a thinner grain contacting surface 6 and/or bottom surface 9. This can result in even more weight reduction.

The invention further relates to an agricultural vehicle 100 comprising a grain pan 1 in accordance to the invention.

What is claimed is:

1. A grain pan for a combine harvester, the grain pan being configured to be moved back and forth in at least a main direction of transportation in order to convey harvested crop in at least the main direction of transportation, the grain pan comprising:
    a plurality of grain pan members one behind the other in a direction substantially parallel to the main direction of transportation, each of the plurality of grain pan members comprising a closed grain contacting surface to engage the harvested crop, each of the plurality of grain pan members further comprising a first connection element and a second connection element, the first connection element being detachably connectable to the second connection element of an adjacent one of the plurality of grain pan members allowing rotatable movement between the adjacent grain pan members as the adjacent grain pan members are connected, the first connection element of each of the plurality of grain pan members being a male part, the second connection element of each of the plurality of grain pan members being a female part, the female part and the male part of each of the plurality of grain pan members having mating shapes.

2. The grain pan according to claim 1, wherein:
    at least one of the plurality of grain pan members has a cross sectional shape which is configured to reinforce the at least one grain pan member, such that the grain contacting surface is prevented from bending when subjected to gravity or operational loads without additional support, and
    the at least one grain pan member is a monolithic body.

3. The grain pan according to claim 1, wherein a frame is connected to the grain pan such that sides of the grain pan and the frame are adjoining when connected.

4. The grain pan according to claim 1, wherein:
- the plurality of grain pan members comprises a first grain pan member and a second grain pan member, the first grain pan member configured to be attached to the second grain pan member,
- the male part of the first grain pan member and the female part of the second grain pan member are configured to allow the male part of the first grain pan member to be entered into the female part of the second grain pan member while holding the first grain pan member under an angle between 0 and 90 degrees relative to the second grain pan member,
- the first grain pan member and the second grain pan member to be brought into an aligned position by subjecting the first grain pan member to a rotating movement relative to the second grain pan member,
- during the rotating movement the angle is reduced to substantially 0 degrees, causing the male part to snap into the female part resulting in a snap connection between the first grain pan member and the second grain pan member, and
- when the male part and the female part are mating, the pretension or friction between the male part and the female part cause the first and second grain pan members to be rigidly connected to each other.

5. The grain pan according to claim 1, wherein the plurality of grain pan members are identical to each other.

6. The grain pan according to claim 1, wherein at least one of the plurality of grain pan members is an extruded element or an aluminum element.

7. The grain pan according to claim 1, wherein the grain contacting surface of each of the plurality of grain pan members has a saw-tooth profile and a substantially flat bottom surface.

8. The grain pan according to claim 1, further comprising:
- a front grain pan member comprising only one of the first connection element and the second connection element of a grain pan members, the front grain pan member configured to be the most upstream of the plurality of grain pan members when viewed in the main direction of transportation; and
- a rear grain pan member comprising only the other of the first connection element and the second connection element of the gran pan members, the rear grain pan member configured to be the most downstream of the plurality of grain pan members when viewed in the main direction of transportation.

9. The grain pan according to claim 8, wherein the front grain pan member comprises a front profile comprising a connector configured to connect a front seal to the grain pan.

10. The grain pan according to claim 8, wherein the rear grain pan member comprises a rear profile comprising a connector configured to connect a rake to the grain pan.

11. The grain pan according to claim 1, wherein at least one of the plurality of grain pan members comprises a bottom surface located substantially opposite of the grain contacting surface of the at least one grain pan member, wherein a cavity is present between the grain contacting surface and the bottom surface.

12. The grain pan according to claim 1, wherein at least one of the plurality of grain pan members comprises a bottom surface located substantially opposite of the grain contacting surface of the at least one grain pan member, wherein the bottom surface comprises an air guide profile that is configured to guide air.

13. A combine harvester comprising:
- a grain pan configured to be moved back and forth in at least a main direction of transportation in order to convey harvested crop in at least the main direction of transportation, the grain pan comprising:
- a plurality of grain pan members one behind the other in a direction substantially parallel to the main direction of transportation, each of the plurality of grain pan members comprising a closed grain contacting surface to engage the harvested crop, each of the plurality of grain pan members further comprising a first connection element and a second connection element, the first connection element being detachably connectable to the second connection element of an adjacent one of the plurality of grain pan members allowing rotatable movement between the adjacent grain pan members as the adjacent grain pan members are connected, the first connection element of each of the plurality of grain pan members being a male part, the second connection element of each of the plurality of grain pan members being a female part, the female part and the male part of each of the plurality of grain pan members having mating shapes.

14. The combine harvester of claim 13, wherein the plurality of grain pan members are identical to each other.

15. The combine harvester of claim 14, wherein the plurality of grain pan members includes a first grain pan member, a second grain pan member, and a third grain pan member, the female part of the first grain pan member being connected to the male part of the second grain pan member, the female part of the second grain pan member being connected to the male part of the third grain pan member.

16. The combine harvester of claim 13, wherein during the rotatable movement between the adjacent grain pan members the male part snaps into the female part and a pretension and/or a friction between the corresponding male part and female part cause the adjacent grain pan members to become rigidly connected to each other.

* * * * *